United States Patent [19]
Tyler

[11] Patent Number: 5,234,265
[45] Date of Patent: Aug. 10, 1993

[54] VALVE FOR AUTOMATIC BRAKE SYSTEM

[75] Inventor: Jeffery A. Tyler, Newark, N.Y.

[73] Assignee: G. W. Lisk Company, Inc., Clifton Springs, N.Y.

[21] Appl. No.: 837,826

[22] Filed: Feb. 18, 1992

Related U.S. Application Data

[62] Division of Ser. No. 505,889, Apr. 6, 1990, Pat. No. 5,123,718.

[51] Int. Cl.⁵ .............................................. B60T 8/64
[52] U.S. Cl. ................... 303/118.1; 303/119.2
[58] Field of Search ............... 303/100, 118, 119 SV, 303/113 R, 113 TR, 3.15, 116, 9.75, 119.2, 113.1, 113.2, 116.1, 116.2; 137/625.61, 625.64; 251/30.01–30.04

[56] References Cited

U.S. PATENT DOCUMENTS

| | | | |
|---|---|---|---|
| 2,194,762 | 3/1940 | Maliphant | 303/118 |
| 2,527,883 | 10/1956 | Ingres et al. | 303/15 |
| 2,919,162 | 12/1959 | Roberts | 303/118 |
| 3,525,555 | 8/1970 | Meyer et al. | |
| 3,924,902 | 12/1975 | Engle | |
| 4,539,542 | 9/1985 | Clark | |
| 4,557,527 | 12/1985 | Stumpe | 303/118 |
| 4,604,600 | 8/1986 | Clark | |
| 4,605,197 | 8/1986 | Casey et al. | |
| 4,860,794 | 8/1989 | Parrott et al. | |
| 5,015,046 | 5/1991 | Bissell | 303/118 |
| 5,100,208 | 3/1992 | Angermair | 303/118 |

Primary Examiner—Matthew C. Graham
Attorney, Agent, or Firm—Eugene Stephens & Associates

[57] ABSTRACT

A brake valve for an automatic brake system includes an actuator responsive to feedback pressure from a brake for regulating pressure in the brake proportional to an electrical signal applied to the actuator. The actuator exerts a force that is opposed by feedback pressure acting against a predetermined area of the actuator. Valves operated by the actuator provide for alternately communicating a supply of pressurized air to the brake cylinders or discharging air pressure from the cylinders. A low-flow vent valve provides for discharging small quantities of air from my valve. However, a pilot operated high-flow dump valve supersedes the low-flow vent valve for discharging larger quantities of air and permits my valve to be controlled by smaller actuating forces.

13 Claims, 2 Drawing Sheets

VALVE FOR AUTOMATIC BRAKE SYSTEM

RELATED APPLICATIONS

This application is a divisional of copending parent application Ser. No. 505,889, filed 6 Apr. 1990, now U.S. Pat. No. 5,123,718 entitled VALVE FOR AUTOMATIC BRAKE SYSTEM. The parent application is hereby incorporated by reference.

BACKGROUND OF INVENTION

My invention relates to a valve for regulating the delivery of air pressure to brakes as a component of an electronically controlled brake system. Most known pneumatic systems incorporating electronic controls allow the brakes to be operated normally until a skidding condition is detected at one of a vehicle's wheels. Once wheel skidding is detected, normal braking operations are overridden and air pressure is released from the appropriate brake until the condition of wheel skid is no longer detected. Such pneumatic systems are known to experience a variety of problems including delayed response time and overshooting or undershooting optimum braking performance.

A typical brake valve modified for use in an anti-skid system is disclosed in U.S. Pat. No. 3,768,519 to Morris. Under normal braking conditions, the brake valve operates as a three-way relay valve controlled by pilot pressure from an operator-controlled foot pedal. When pressure is applied to the foot pedal, pressurized air enters a control chamber and moves a pilot piston closing off a brake exhaust passage and releasing pressurized air into a delivery chamber for the brakes. Pressure increases in the delivery chamber opposing the pilot piston until an approximate equilibrium is reached with the control chamber which closes off the further supply of pressurized air to the delivery chamber. When the pilot pressure in the control chamber is decreased, pressurized air is released from the delivery chamber until a new equilibrium is reached.

The valve of U.S. Pat. No. 3,768,519 also incorporates electronic controls to further regulate pilot pressure in response to a signal indicating a wheel skid condition. When a wheel skid condition is detected, a solenoid valve opens an exhaust passage from the control chamber and blocks further communication between the foot pedal and the control chamber. The release of pilot pressure causes the relay valve to exhaust a proportional amount of pressure from the brake delivery chamber. Once the skid signal is terminated, the exhaust passage is closed and the brake pedal is placed back in communication with the control chamber. Thus, the known solenoid-operated valve provides for overriding the normal operation of a brake relay valve to temporarily relieve excess pressure applied to the brakes.

Although such valves provide some improvement in braking performance, they tend to react quite slowly to dynamic changes in braking conditions. For example, the rate at which brake pressure can be decreased is delayed by the time it takes to release required quantities of air from the control chamber. Similarly, the rate at which an increased amount of pressure can be added to the brakes is delayed by the time it takes to fill the control chamber with the required amount of air. Further, there are delays associated with sequentially opening and closing the required passages for controlling pilot pressure as well as delays associated with opening and closing passages in response to the pilot pressure.

U.S. Pat. No. 3,857,615 to Acar proposes to vary the rate at which air pressure is released from the control chamber to accommodate different braking conditions. For example, when a large amount of pilot pressure is applied in the control chamber, a much faster release of pressure is allowed than when pilot pressure is somewhat smaller. This feature helps to limit the amount brake pressure overshoots or undershoots a desired braking value in a slowly changing braking environment.

However, the amount of braking pressure applied remains time dependent. That is, the instantaneous pressure in the delivery chamber remains a function of the length of time at which the control valves are opened and closed. Further, the time required to change pressure levels in the delivery chamber depends on the volume of air that must be received or discharged from the control chamber. In an actual braking environment where braking conditions change dynamically, braking response of the known valves may lag so far behind changes in the braking environment that the known brake valves may be continuing to discharge pressure when increased brake pressure is required and vice versa. Thus, the known valves provide for a very inefficient braking response which fail to make use of all of the available traction.

In trucks, the brake valves associated with different wheels are positioned at significantly different distances from the operator-controlled foot pedal. During normal braking operations, the response time of the rear brakes may lag behind the response of the front brakes. Timing valves are known which delay the response of the front brakes to at least approximately match the response time of the rear brakes, but this also delays an initial braking response.

SUMMARY OF THE INVENTION

My invention overcomes the above-identified problems with known automatic brake systems by providing an electrically actuated valve for delivering air pressure to a brake cylinder proportional to an electrical signal. For example, my valve may include an actuator that controls delivery of pressurized air to a brake by generating a force, opposing feedback pressure from the air brake, that is proportional to current applied to the actuator. The potential air pressure in the brake is equal to the source of the pressurized air, but the actual air pressure in the brake is limited to a feedback pressure that is sustained by an electrical current applied to the actuator.

In contrast to the way in which prior valves in automatic braking systems have been operated, my valve requires an electrical current for delivering air pressure to a brake cylinder. The amount of pressure delivered to the brake is proportional to this current. Thus, instead of using an electrical signal to modulate the operation of a valve ordinarily controlled by operator-regulated pneumatic pressure, my valve is controls the delivery of air pressure to brake cylinders directly proportional to an electrical signal alone. However, the electrical signal may be regulated by an operator or overridden by an onboard system for adapting a braking response to sensed operating conditions. For example, the braking response may be adapted to avoid both wheel skidding and wheel slipping conditions. Electronic controls for generating such signals are widely available and the specifics of which are not considered a part of my invention. Instead, my invention is directed to a novel valve which may be incorporated as a central component of a system for controlling brake pressure in response to an electrical signal.

By way of example, my valve may include a housing enclosing a network of chambers and valves which cooperate with an actuator that responds to an electrical signal. The chambers include a supply chamber, a delivery chamber, and a relief chamber. An inlet valve connects the supply chamber to the delivery chamber. A control valve connects the delivery chamber to the relief chamber. A low-flow vent valve connects the relief chamber to a primary exhaust port; and finally, a high-flow dump valve connects the delivery chamber to a secondary exhaust port. Although named as separate structures, the control and vent valves together define a single three-way vent valve.

The actuator moves in response to an electrical signal indicating a desired delivery pressure, thereby closing the control valve and opening both the inlet valve and the low-flow vent valve. However, movement of the actuator is opposed by a feedback pressure which accumulates in the delivery chamber. When the feedback pressure equals the desired delivery pressure, the inlet valve is also closed.

Portions of both the inlet and control valves may be formed as part of a single poppet assembly which spans the supply chamber. The poppet assembly is generally balanced with respect to pressure in the supply chamber. However, a light spring force is applied to the poppet assembly to urge the inlet valve into a closed position. Accordingly, a threshold level of current must be applied to the actuator to open the inlet valve.

A seat portion of the control valve is formed as a part of the poppet assembly and a poppethead portion of the same valve is attached to the actuator. Feedback pressure from the delivery chamber is communicated through a bore formed in the poppet assembly and tends to separate the poppet assembly and actuator portions of the control valve. When the feedback pressure accumulates to a level which overcomes a force imparted by the actuator against the poppet assembly, the control valve is opened allowing the feedback pressure to enter the relief chamber. However, the inlet valve seat is made slightly larger than the control valve seat to assure that the inlet valve is closed before the control valve is opened.

Pressure levels in the relief chamber control the way in which air is discharged from the delivery chamber. Small decreases in desired delivery pressure result in only slight increases in pressure in the relief chamber and can be accommodated by discharging the delivery chamber through the control and low-flow vent valves. Small quantities of air bleed past the low-flow vent valve through the primary exhaust port to the atmosphere allowing precise pressure control. However, the passage through the control and vent valves is too small to accommodate larger volumes of air associated with large decreases in desired delivery pressure. Accordingly, the separate high-flow dump valve is provided for directly discharging the delivery chamber through a secondary exhaust port in response to a predetermined pressure in the relief chamber. The accumulation of pressure in the relief chamber closes the vent valve and provides a pilot pressure for opening the dump valve. The passage from the delivery chamber through the dump valve is made much larger than the passage through the control and vent valves for more rapidly discharging delivery pressure.

The separate dump valve enables the control valve to be sized so that only small levels of current are needed to operate the actuator. Since it is possible to discharge large quantities of air from the delivery chamber through the separate dump valve it is not necessary to size the control valve to accommodate large air flows. Accordingly, the control valve may be sized so that my valve may be operated with an average of only twelve watts of power supplied from an onboard battery.

DRAWINGS

DETAILED DESCRIPTION

Figure 1:
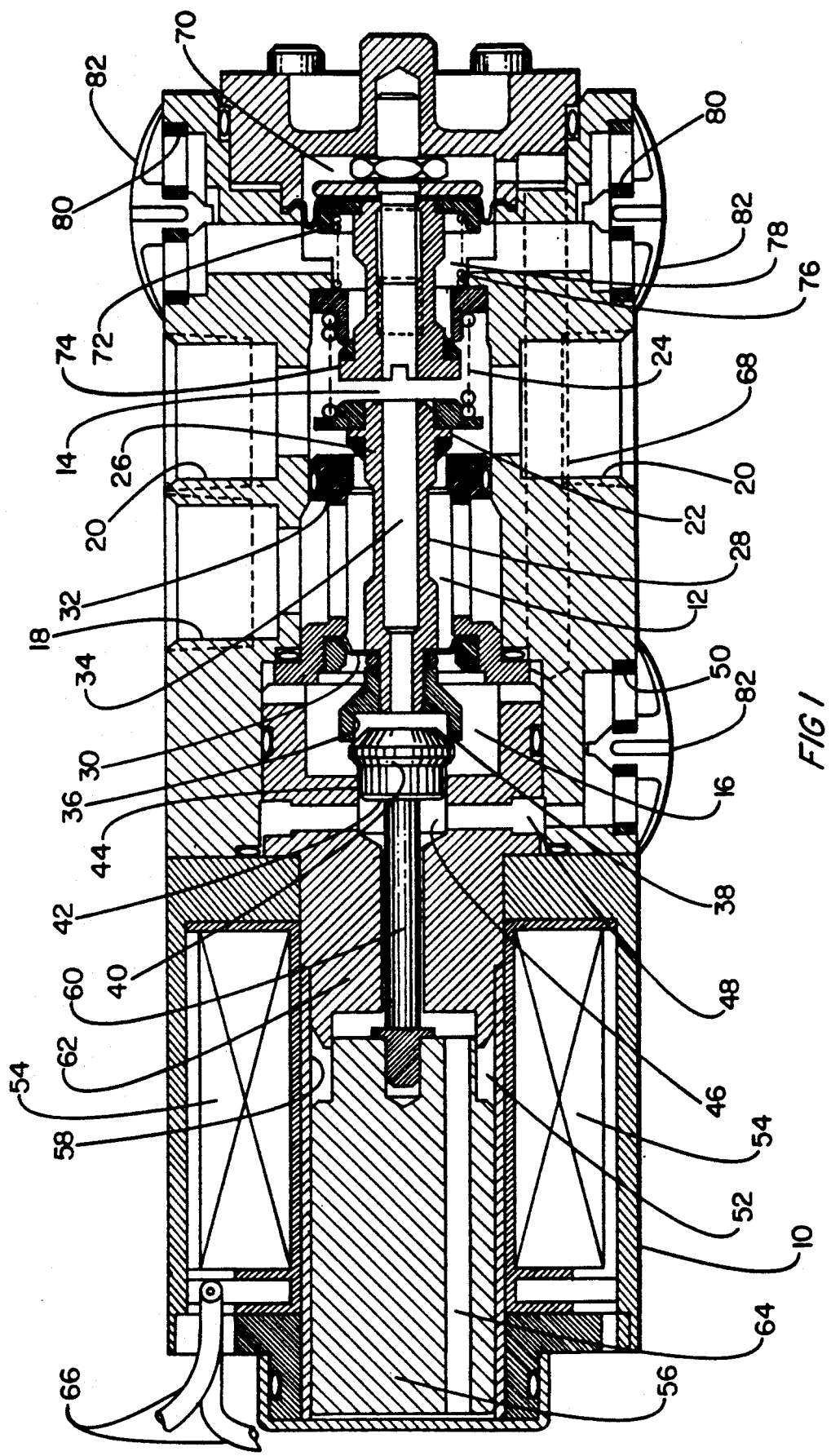
FIG. 1 is a cross-sectional view of my preferred brake valve.

My preferred valve is shown in FIG. 1. A housing 10 encloses my valve defining three main chambers, namely, supply chamber 12, delivery chamber 14, and relief chamber 16. Supply port 18 connects a supply of pressurized air to supply chamber 12. Delivery ports 20 connect a vehicle's brake chambers with the delivery chamber. Although two delivery ports are illustrated, as few as one port or several ports may be used, depending upon the number of brake cylinders to be controlled by my valve.

Supply chamber 12 and delivery chamber 14 are connected by inlet valve 22 that is normally biased to a closed position by spring 24. Primary valve head 26 is carried on poppet assembly 28 which, together with diaphragm 30, isolates the supply chamber from the rest of the valve. Diaphragm 30 and inlet valve seat 32 are similarly sized so that poppet assembly 28 is balanced by the supply of pressurized air.

Feedback passageway 34 is formed through poppet assembly 28 connecting delivery chamber 14 with relief chamber 16. The feedback passageway terminates at a seat 36 of control valve 38. One side of poppethead 40 forms the head of control valve 38, and the other side of poppethead 40 forms the head of vent valve 42. A locating portion 44 of the poppethead fits loosely within a bore 46 that connects relief chamber 16 with primary exhaust passage 48 and primary exhaust port 50. The bore 46, which also forms the seat of vent valve 42, is sized approximately equal to the seat 36 of the control valve so that force acting against the poppethead 40 does not vary with its position in contact with either seat.

Normally, both control valve 38 and vent valve 42 are open allowing the brake cylinders to vent to atmosphere through primary exhaust port 50. However, when brake pressure is needed, the poppethead is moved by solenoid actuator 52 in a direction which closes off the control valve and opens the inlet valve. Solenoid actuator 52 includes the usual features of energizing coil 54 and armature 56 that is movable within core 58. Poppethead 40 is connected to armature 56 by stem 60 which extends through pole piece 62. Bore 64, formed through the armature, cooperates with a bore formed through pole piece 62 to vent any backup pressure in the solenoid through primary exhaust port 50.

The solenoid is activated by a current which is transmitted to its coils by wires 66. The amount of force exerted by the solenoid against control valve seat 36 is proportional to the amount of current applied to the solenoid coil and remains substantially constant throughout its stroke. Only a small amount of current is required to initially close the control valve, but a predetermined threshold value of current is required to move the poppet assembly against spring 24 to open the inlet valve. Once the inlet valve is opened, a supply of pressurized air is delivered to the brake cylinders through the delivery chamber. The same pressure is also communicated by feedback passageway 34 to the control valve. The feedback pressure acting on the end of poppethead 40 opposes the force imparted by the solenoid. Any additional supply pressure over that which can be opposed by the amount of force imparted by the solenoid tends to push open the control valve and release the additional supply pressure into the relief chamber. However, the diameter of the control valve seat is made slightly smaller than the diameter of the inlet valve seat so that the inlet valve is closed before the control valve is opened. The control valve remains open until an equilibrium is restored between the force imparted to the solenoid and the feedback pressure at the control valve seat.

When the differential force between the solenoid and the feedback pressure is quite small, only a small amount of air escapes through the control valve and is vented from the relief chamber through vent valve 42. However, larger differential forces push the poppethead portion of the vent valve into a closed position sealing off bore 46 from relief chamber 16. Pressure which accumulates in relief chamber 16 is communicated by relief passage 68 to pilot chamber 70. Since the pressure in pilot chamber 70 matches the pressure in relief chamber 16, pilot chamber 70 may also be considered as an extension of relief chamber 16.

Pressure in the pilot chamber acts against piston (or diaphragm) portion 72 of dump valve 74. A light spring 76 opposing piston portion 72 normally urges the dump valve into a closed position sealing off delivery chamber 14 from secondary exhaust passage 78. Pressure in delivery chamber 14 also urges the dump valve into a closed position. However, pressure in the pilot chamber 70 acts over a larger area of piston portion 72 than the seat area of the dump valve acted on by the delivery pressure, and the pilot pressure easily overcomes the opposing forces at a predetermined threshold value. Once opened, the dump valve allows the delivery chamber to discharge through secondary exhaust ports 80. The dump valve discharges air pressure from the delivery chamber much more rapidly than the control and vent valves. However, both secondary exhaust ports 80, and primary exhaust port 50 are covered by protective umbrellas 82 to prevent contamination of the valve from outside sources.

Although the dump valve is illustrated within the confines of housing 10, it would also be possible to assemble the dump valve in a separate housing which is attached to housing 10 by conduits connecting the delivery chamber and relief chamber to the dump valve in a similar manner. For example, the dump valve could be biased into a closed position within its own chamber in open communication with the delivery chamber and the relief passage 68 could be extended beyond housing 10 and connect to a pilot chamber in the separate housing.

The illustrated valve depicts an equilibrium condition at which a constant pressure is applied to the brake cylinders. The equilibrium position is reached by first applying a predetermined amount of current to the solenoid coil 54. In response, the solenoid armature 56 moves the poppethead 40 against the poppet assembly 28, thereby closing the control valve 38 and opening the inlet valve 22. The delivery chamber 14 is charged by the supply pressure passing through the inlet valve, and a feedback pressure from the brake cylinders is generated in opposition to the solenoid armature and poppethead through the poppet assembly. Once the feedback pressure acting against the poppethead overcomes the force imparted by the solenoid, the poppethead and armature are driven back until the inlet valve closes. Any small amounts of feedback pressure which momentarily exceed the solenoid force bleed past the control valve and escape to the atmosphere through the vent valve and primary exhaust port. In the equilibrium condition, the relief chamber is maintained at near atmospheric level and the dump valve remains closed. The same sequence of operations is followed for any further increase in desired pressure applied to the brake cylinders. The rate at which such increases can be made is limited primarily by the rate at which supply pressure can be communicated to the delivery chamber.

My valve also provides for rapidly reducing brake cylinder pressure in response to a reduced amount of current applied to the solenoid actuator. Small decreases in desired delivery pressure are handled in much the same way as the momentary increases in feedback pressure accompanying desired increases in delivery pressure. That is, the excess delivery pressure is bleed past the control valve and is exhausted to the atmosphere through the vent valve. However, the control and vent valves are not sized to accommodate air flow required for more rapid discharges of delivery pressure. Accordingly, pressure rises in the relief chamber closing the vent valve. However, the same pressure is immediately communicated to the pilot chamber, thereby opening the dump valve and allowing a rapid discharging of the delivery chamber until the feedback pressure matches the lower solenoid force. Once this occurs, the control valve is closed and any residual pressure in the relief chamber is vented through the vent valve.

Figure 2:
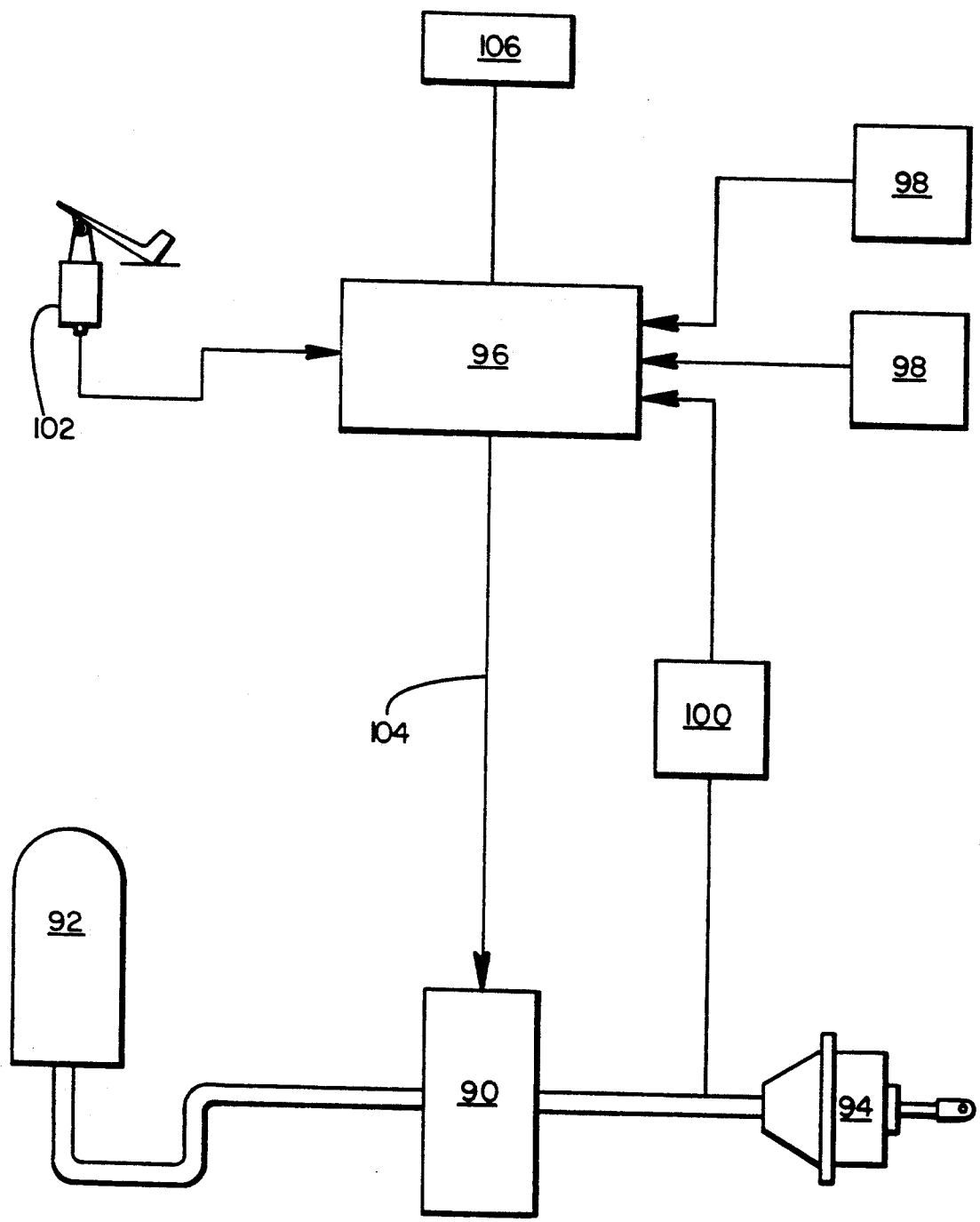
FIG. 2 is a schematic depiction of an automatic brake system incorporating my valve.

An important application of my new valve is depicted in FIG. 2. My new valve 90 is shown connecting brake cylinder 94 to a source of pressurized air 92. An onboard microprocessor control system 96 receives input from several sources including sensors 98 for monitoring wheel slip and wheel skid conditions, sensor 100 for measuring pressure being supplied to the brake cylinder, and sensor 102 for measuring braking effort desired by a vehicle operator. The control system processes this information in accordance with the desired requirements of the system and generates a level of current which is communicated to my valve by wires 104.

A source of electrical power 106 is supplied to the onboard system for operating my valve. Although vehicles ordinarily generate their own electrical power during use, the solenoid assembly of my invention is sized so that the brakes will operate properly using the vehicle battery as a sole source of power. This feature enables the brakes to operate even if a vehicle is turned off or stalls.

Although the system shows only one of my valves controlling a single brake, a separate valve may be provided for each brake of the vehicle or for each group of brakes. Preferably, my brake valves are located in the vicinity of the brake cylinders. This feature minimizes and balances reaction time of the brakes.

Further, although my preferred valve is controlled by a solenoid actuator, it would also be possible to substitute other types of electrical actuators, including indirect electrical actuators such as a stepper motor acting through a ball screw and spring or another electrically actuated pneumatic pilot head. My valve has also been designed especially for the brake systems of trucks, but my valve may also be useful in a variety of other braking and pressure control applications. Other adaptations and variations of my valve will be apparent within the spirit and scope of my invention as set forth in the appended claims.

I claim:

1. An electrically actuated valve assembly comprising:
   an actuator responsive to feedback pressure from a brake for regulating pressure in the brake proportional to an electrical signal applied to said actuator;
   an inlet valve connecting a supply chamber for receiving input pressure to a delivery chamber for communicating pressure to the brake, said actuator providing for opening said inlet valve in response to said electrical signal for delivering increased pressure to the brake;
   a control valve connecting said delivery chamber to a relief chamber for discharging said delivery chamber, said actuator providing for closing said control valve in opposition to said feedback pressure for delivering increased pressure to the brake; and
   a vent valve directly connecting said relief chamber to a primary exhaust passage, said actuator providing for opening said vent valve in response to said electrical signal for delivering increased pressure to the brake.

2. The valve assembly of claim 1 further comprising a dump valve connecting said delivery chamber to a secondary exhaust passage, said dump valve being opened in response to a predetermined pressure in said relief chamber.

3. The valve assembly of claim 2 wherein said vent valve is closed in response to the predetermined pressure in said relief chamber.

4. The valve assembly of claim 3 wherein said dump valve encloses an opening which is larger than said vent valve.

5. The valve assembly of claim 4 also having a pilot chamber connected to said relief chamber, said predetermined pressure in said relief chamber being substantially equal to pressure in said pilot chamber.

6. The valve assembly of claim 5 wherein said pressure in said pilot chamber acts against a piston portion of said dump valve for opening said dump valve in response to said predetermined pressure in said pilot chamber.

7. The valve assembly of claim 4 in which said actuator includes a poppethead having a locating portion that fits within a bore connecting said relief chamber to said primary exhaust passage.

8. The valve assembly of claim 7 in which said poppethead forms a head portion of said vent valve for closing said bore connecting the relief chamber to the primary exhaust passage.

9. The valve assembly of claim 8 in which a seat portion of said control valve and a head portion of said inlet valve form parts of a poppet assembly movable by said actuator.

10. The valve assembly of claim 9 in which a feedback passage is formed through said poppet assembly for connecting said delivery chamber to said relief chamber.

11. The valve assembly of claim 10 in which said poppethead also forms a head portion of said control valve for closing said feedback passage connecting the delivery chamber to the relief chamber.

12. The valve assembly of claim 11 wherein said inlet valve encloses an opening slightly larger than an opening enclosed by said control valve.

13. The valve assembly of claim 12 wherein said control valve is sized so that the valve assembly is operable by levels of power supplied by an onboard battery.

* * * * *